Oct. 16, 1962     T. C. WENZEL     3,059,091

COMBINATION HEATER, AERATOR, AND BACKDROP FOR AQUARIUM

Filed May 9, 1961

INVENTOR.
THOMAS C. WENZEL
BY James H. Conner
AGENT.

3,059,091
COMBINATION HEATER, AERATOR, AND BACKDROP FOR AQUARIUM
Thomas C. Wenzel, 600 Woodbury Road, Plainview, N.Y.
Filed May 9, 1961, Ser. No. 108,801
1 Claim. (Cl. 219—41)

This invention relates generally to aquarium tanks of the glass or transparent material type for maintaining and displaying live fish and/or plants and more particularly to a decorative backdrop or background member that co-acts as and integrally combines a radiant water heater and an aerating conduit.

Heretofore, a fish tank of the class described was generally provided with an immersion type heater to maintain a substantially constant water temperature and a separate and distinct aerating system to provide a source of oxygen for the fish and plants living within the water in the tank. The heater and aerator were purely functional in design and detracted from the pleasing artistic appeal of the fish tank or aquarium. In a similar manner, the immersion type heater, generally located in one corner of the tank, created a hazard to the fish living in the tank in that the heater generated heat to but a single section of the tank and this heat became dissipated within the water. The water area remote from the heater often was subject to a differing lower temperature. The present invention eliminates this spot heating and provides a radiant heating surface that is in substantial contact with the water throughout the length and height of the aquarium. Accordingly, one of the principal objects of the invention resides in the provision of a decorative radiant heater having heating means embedded therein that equally distributes and radiates heat throughout a relatively large area of an aquarium, and more accurately maintains a constant even temperature throughout the water mass of the tank.

Still another object of the invention resides in the provision of an aerating conduit embedded within the decorative backdrop that is concealed by the decorative rocks or rock representations on the exposed face of the backdrop and which is readily integrated with an external conventional air pumping system to aerate the water in the aquarium.

Yet another object of the invention is to provide a decorative backdrop that is pleasing to the eye and which closely resembles the natural habitat of the fish or plants in the aquarium.

Other ancillary objects will be in part hereinafter pointed out and will be in part hereinafter apparent.

Figure 1:
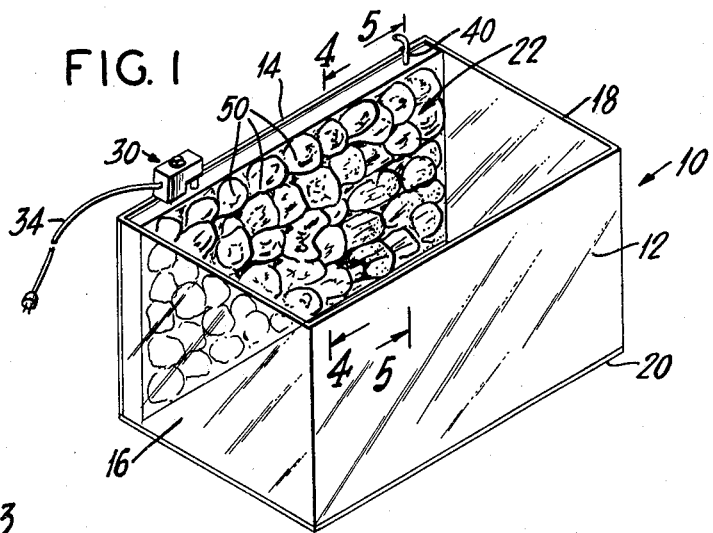
FIGURE 1 is an isometric projection of a typical transparent aquarium having the novel backdrop positioned within the tank and against the rear wall of the tank.
Figure 2:
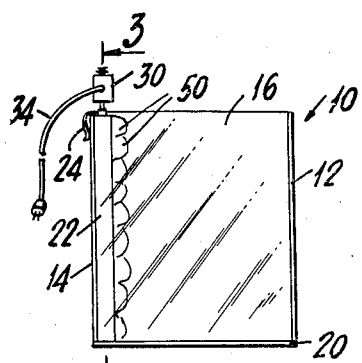
FIGURE 2 is a side elevation of the aquarium having the novel backdrop.

Referring to the drawings in detail, 10 generally designates an aquarium or fish tank having transparent front and rear walls 12 and 14, respectively and transparent side walls 16 and 18, respectively. A base 20 supports the sides and the front and rear walls. The aquarium 10, it will be understood, is water-tight and is adapted to hold a quantity of water disposed therein.

Figure 3:
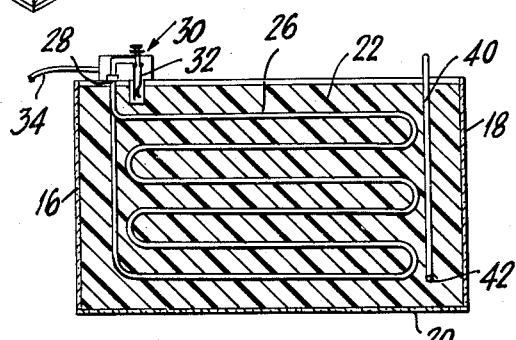
FIGURE 3 is a longitudinal cross-section taken along line 3—3 of FIGURE 2.
Figure 4:
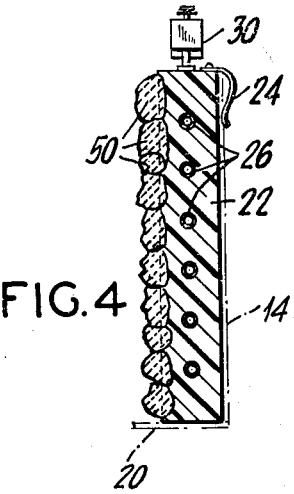
FIGURE 4 is a transverse cross-section taken along line 4—4 of FIGURE 1.
Figure 5:
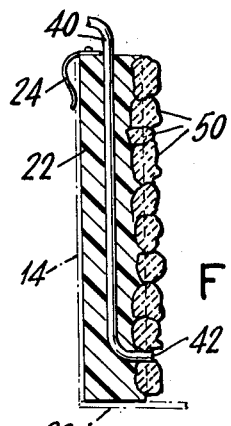
FIGURE 5 is a transverse cross-section taken along line 5—5 of FIGURE 1.

Disposed adjacent to the rear wall 14 within the aquarium 10 is the backdrop 22 which is preferably formed of a plastic material impervious to water and which is secured in position by means such as the clips 24. The backdrop or member 22 is substantially rectangular in shape to conform to the shape of the typical aquarium and has embedded therein a heating coil 26 which is disposed substantially throughout the area of the member 22 in coiled relationship. The terminal ends of coil 26 project above the tank and above the upper wall of the member 22, such as shown at 28 in FIGURE 3. The heating coil 26 may be of the resistance element type that effectively produces or generates heat when electricity is connected thereto. A thermostat 30 may be included in the circuit with bi-metallic elements 32 embedded within the member 22 to effectively control the desired heat of said member. A connecting cord 34 is provided to couple the heater 26 to a source of alternating current. Also embedded in the member 22 is a conduit 40 which extends above the upper wall of the member 22 at one end and which extends through the front wall of the member 22 at its lower end, such as designated at 42 in FIGURE 5. The conduit is open at 42 and provides an air passage for pumped air to the bottom of the water in the tank. The conduit 40 is, of course, connected to the air system of an external conventional air pump, not shown. The rocklike formations 50 that are embedded within the surface of the member 22 are of such a nature to be both decorative and pleasing to the eye and also to resemble the natural habitat of the fish or plants that are living in the aquarium. It will be noted that the opening 42 of the conduit is substantially covered by one of the rocklike formations 50 so that the conduit is concealed and air passing through said conduit merely bubbles up the side of the rock formation.

While there has been shown and described but a single embodiment of the invention, it will be understood that many modifications and changes could be made without departing from the scope of the invention as set forth in the following claim.

The invention claimed is:

In an aquarium for displaying live fish and plants, the combination of a radiant water heater and a decorative backdrop, said backdrop comprising a vertical member having dimensions substantially similar to one vertical wall of the aquarium, means to position the member within the aquarium adjacent to said wall, a heating coil embedded in said member and disposed to substantially heat said member to a predetermined substantially equal temperature throughout the area of the member, and decorative rock-like material affixed to said member to conceal the radiant heater, and an air conduit embedded in said member having an opening at one end above the upper marginal edge of the member and an opening at the other end disposed adjacent to the lower marginal edge and projecting into the aquarium and said lower conduit opening being similarly concealed by said decorative rock-like material.

References Cited in the file of this patent

UNITED STATES PATENTS

| | | |
|---|---|---|
| 1,824,823 | Kump | Sept. 29, 1931 |
| 2,477,363 | Danner | July 26, 1949 |
| 2,515,538 | Wall | July 18, 1950 |
| 2,566,921 | Briscoe | Sept. 4, 1951 |
| 2,816,207 | Boggs | Dec. 10, 1957 |